US005732528A

United States Patent [19]
Peronek et al.

[11] Patent Number: 5,732,528
[45] Date of Patent: Mar. 31, 1998

[54] CONTAINER GUIDE FOR A FILLING AND CAPPING MACHINE

[75] Inventors: Michael H. Peronek, Strongsville; Kevin Sweeney, Columbia Station, both of Ohio

[73] Assignee: FCI, Inc., Cleveland, Ohio

[21] Appl. No.: 681,364

[22] Filed: Jul. 23, 1996

[51] Int. Cl.$^6$ .............................. B65B 7/28; B65B 59/00
[52] U.S. Cl. ..................... 53/201; 53/253; 53/300
[58] Field of Search ........................ 53/201, 253, 249, 53/300, 471, 283, 282, 272, 273

[56] References Cited

U.S. PATENT DOCUMENTS

| | | | |
|---|---|---|---|
| 2,987,313 | 6/1961 | Bjering | 269/153 |
| 3,432,989 | 3/1969 | Bouzereau | 53/300 X |
| 3,875,725 | 4/1975 | Carmichael | 53/38 |
| 4,114,347 | 9/1978 | Morris | 53/300 |
| 4,295,320 | 10/1981 | Willingham | 53/201 |
| 4,624,098 | 11/1986 | Trendel | 53/314 |
| 4,663,913 | 5/1987 | Trendel | 53/314 |
| 4,939,890 | 7/1990 | Peronek | 53/486 |
| 5,581,975 | 12/1996 | Trebbi et al. | 53/300 X |

*Primary Examiner*—James F. Coan
*Attorney, Agent, or Firm*—Vickers, Daniels & Young

[57] ABSTRACT

An improved container guide for a bottling machine for filling or capping containers having a generally circular cross-section is provided. The container guide serves to retain the containers in the machine during conveyance through the bottling line. A rotatable star wheel is provided for moving the container through the machine and includes a pocket support for supporting the containers thereon. A rear guide is located radially outward from the star wheel and is used to retain the containers within the pocket support during rotation. The star wheel and rear guide each include a side wall or body guides to maintain the sidewall of the containers in position during rotation of the star wheel. An adjusting mechanism is provided on each guide to change the position of the guide to accommodate different size bottles.

70 Claims, 8 Drawing Sheets

CONTAINER GUIDE FOR A FILLING AND CAPPING MACHINE

The present invention relates generally to an apparatus for use in the bottling industry for filling or capping containers and more particularly to an improvement which allows for adjustment of the position of the container guide to accommodate different size bottles to be run on the same machine.

The invention is particularly applicable to the container guide which retains the containers in the filling or capping machine as bottles pass through the machine and will be described with particular reference thereto.

BACKGROUND OF THE INVENTION

Machines in the bottling industry for filling containers or capping containers after being filled are well known in the prior art. As defined herein, such machines are collectively referred to as bottling machines. Reference may be had to U.S. Pat. No. 4,939,890, 4,624,098 and 4,295,320, incorporated by reference herein for a description of applications for conventional type capping machines. For purposes herein, capping and bottling machines have the same characteristics. Such machines will not be described in detail in this specification.

Generally, a capping or filling apparatus includes a rotatable star wheel mechanism for moving the bottles or containers through the machine. The star wheel also generally includes a mechanism for supporting the container which can either be removable neck support assemblies or pockets within the star wheel hub itself that are arranged about the periphery of the star wheel. An infeed mechanism or conveyor is utilized to bring bottles to an entry point of the star wheel and an outfeed mechanism or conveyor is similarly mated to the rotatable star wheel mechanism to transfer the capped (or filled) bottles from an exit point of the star wheel. A stationary rear guide extending generally between the entry and exit point is spaced radially outwardly from the neck support assembly on the rotatable star wheel. This rear guide functions to retain the bottles in the individual pockets of the neck support assembly as the star wheel rotates. In a conventional capping apparatus, a turret capper head is directly over the capper star wheel and moves in synchronous rotation with the capper star wheel. In a bottle filling apparatus, a filling head is located above the capper star wheel. Either the capper head or the filling head is driven axially downward at pre-determined periods of time to place a tightened cap onto the bottle neck or to place product within the bottle.

Within a bottling plant or facility, a single capping or filling machine is used to fill or cap many different sized bottles. In the soft drink industry such size bottles can include a 12-oz, a 20-oz, a 1-liter bottle or others. Positive control of the bottles throughout the machine is typically maintained by holding the bottles by the neck. Thus, based upon a predetermined control height, all bottles will be suspended throughout the filling or capping process by the bottle neck ring. The control height is determined by the tallest bottle to be filled. This height is then maintained constant for all other size bottles to be run in the same machine. Normally, the bottle will be suspended ¼ inch above the normal wear surface. Mounted on the basic shaft of the bottling machine is a hub which supports the mounting plate and star wheel thereon. As the shaft is rotated, the hub rotates the star wheel thus moving bottles through the machine to accomplish the capping and filling process.

Smaller star wheels include and neck support assemblies integral with the hub. Larger star wheel assemblies include neck guide assemblies mounted on the star wheel. Each neck guide assembly has fingers extended therefrom and supports the neck of the bottle. In order to retain the control height constant for different size bottles, each bottle requires a different size and/or shape neck support bracket and lower body guide support for the sidewall of the bottle. Thus in each instance where the bottle size to be run is changed, it is necessary to change over different aspects of the bottling machine including those portions of the machine which are specific to the particular bottle size being run on the line.

In a bottling plant, such a change over requires the use of skilled labor to remove the equipment which is specific for a particular sized bottle and replace it with substitute equipment which is specific for a different size bottle. Thousands of bottles pass through a bottling machine each hour. Maintaining this volume is very important to meet both consumer and industry demands as well as plant capacity. As such, the down time associated with a change over to different size bottles is a significant loss in both dollars and lost productivity due to reduced output capacity, idle manpower and the skilled work force required to complete a change over. The use of common fasteners such as bolts to attach the interchangeable aspects of the bottling machines increases the time required to complete a change over and also adds to the number of spare parts which must be inventoried and readily available should others become lost or broken. Further, care must be taken during change over to insure that all bolts are fastened tightly. Failure to do so may result in bolts coming loose and causing damage to a machine or shutting down an entire line within a bottling plant.

Typically, rear container guides are located radially outward from the star wheel for retaining the container within the pocket support of the star wheel during rotation. The rear guides usually have an inner radial surface corresponding with the arc about which the bottles rotate on the star wheel. Rear container guides include both a rear guide plate used opposite the pocket support and a sidewall or body guide which supports the thicker section of the bottle below the neck. Generally, the rear guide plate is located at a fixed position at the control height. Sidewall guides or body guides are mounted to the rear guide plate by use of bolt fasteners or cap screws in order that they are placed in proper position for the different size bottles. Often, body guides are suspended from a fixed rear guide plate. When it is desired to change the size of bottles being run, the sidewall guide or body guide is removed by removing the bolts or screws and replacing it with a different size body guide. Generally, the different size body guide utilizes structure in order that it is suspended at a different height from the fixed rear guide plate than the previous size body guide. Removal of the sidewall guide together with installing a different size sidewall guide further adds to the time required to change over a bottling line. In addition the change over requires the use of skilled labor for installation and removal. Further, a storage area of significant size is also required in order that different size parts can be safely stored away until they are required.

Similarly, the star wheel mechanism includes a body guide for supporting the lower thicker portion of a bottle, working with the sidewall rear guide to keep bottles in place. This body guide must also be adjusted for the size of the bottle to be run through the machine, adding to significant cost in downtime and underutilized plant capacity.

The configuration of prior art bottle supports including star wheel body guides and rear container guides may vary, for instance sidewall guides or body guides may be built up from the floor versus being suspended from the rear guide plate. However, each of the configurations currently being used has the requirement of being changed each time a different size bottle is to be run. Further, each change requires removing and replacing bolts and screws.

SUMMARY OF THE INVENTION

The present invention advantageously provides an improved container guide system for a bottling machine which overcomes the disadvantages of prior art container guide arrangements. In this respect, the star wheel and rear container guides have been redesigned so that the body guide on the star wheel, also referred to herein as body star, and the sidewall guide on the rear container guide are capable of quick adjustment without the necessity to remove and reinstall different guides for different sized bottles. Change over mainly requires depressing a button on each guide to release an adjustable locking mechanism and to slide the guide along a positioning rod to a desired new position. A positioning block located on the guides holds the adjustable locking mechanism and effectively moves the body guide and/or sidewall guide to its new position where the button is released to lock the guide in place. If necessary, the easy adjustment also allows for quick and easy removal of the guide and replacement with another guide having the size requirements desired. This improved container guide system significantly reduces the down time of a bottling line due to a change over. No tools are needed to effect the change over as it relates to container guides and skilled labor is generally not required. A machine operator is capable of depressing the button for releasing and sliding the body guide, or body star, on the star wheel or the sidewall guide on the rear container guide to a second position where the button is released and the guide is locked into place. No adjusting or other tools are required. The present invention significantly reduces the number of parts necessary to effect a change over on a bottling line and provides a positive adjustable control guide once the initial modifications to install the invention are made to the bottling machine. After the initial modifications, no further modifications other than the adjustment described above, are required to run different size bottles.

More particularly in this respect, a conventional bottling machine for filling or capping containers having a generally circular cross section is provided with improved container guides which are easily adjustable to accommodate different size bottles in a bottling line. The bottling machine comprises a rotatable star wheel for moving the containers through the machine including pocket support members on the star wheel for holding and supporting the containers through the machine. A rear container guide assembly is located radially outwardly from the star wheel. The rear guide assembly retains the containers within the pocket support members during rotation of the star wheel. Each of the star wheel and rear guide assembly includes a body guide or sidewall guide assembly which maintains the sidewall (i.e. the thicker section) of the containers in the desired position during rotation of the star wheel. An adjusting mechanism for changing the desired position of either the body guide or sidewall guide assembly is provided in order that the machine may be adjusted to accommodate different size containers.

As a preferred embodiment only, a positioning block is provided which is fixedly attached to each of the body guide and sidewall guide assembly. A positioning rod extends downwardly from the star wheel and rear container guide assembly, respectively, and includes a plurality of circumferential concave grooves at spaced increments along the longitudinal length of the positioning rod. The positioning block slides along the positioning rod and releasably attaches to the positioning rod at the location of one of the concave grooves. Located within the positioning block is a spring biased piston which is cooperable with the positioning rod for releasably attaching the positioning block to the positioning rod at the location of one of the grooves. The hole within which the piston is located intersects within the hole about which the positioning rod slides in order that the piston is capable of directly intersecting with the positioning rod. The spring biased piston has an extended (locked) position and a depressed (unlocked) position. The hole for the spring biased piston and the opening for the positioning rod intersect within the positioning block. In the depressed position, the piston is capable of sliding over the positioning rod. When the piston is released and biased into an extended position, the piston engages with one of the concave grooves on the positioning rod to form an interference fit preventing further movement of the positioning block and attached body guide assembly and/or sidewall guide assembly. During a bottling line change over, the position of the body guide assembly and sidewall guide assembly may be changed, or the guide assembly replaced, by simply depressing that portion of the piston extending from the positioning block. This disengages the spring biased piston from one of the concave grooves within the positioning rod, whereby the positioning block assembly may slide up and down on the positioning rod into a desired position.

In order to provide the subject of the invention on an existing bottling machine, positioning rods having the concave grooves described herein can be retrofitted to an existing star wheel assembly and/or the fixed rear container guide assembly, each of which is initially installed at the predetermined control height. Preferably, the positioning rods are suspended below the star wheel and the rear guide assemblies. Body guides are provided with positioning blocks which are attached thereto and bores in the body guides are made and aligned with the positioning blocks. The existing side wall guide assemblies are retrofitted by attaching the necessary positioning blocks thereon, and aligned with the bores placed therein. Once this initial retrofit takes place, the modified container guide system is ready for use with a number of different size bottles in the bottling plant.

It is thus, an outstanding object of the present invention to provide an improved container guide system for a bottling machine.

It is yet another object of the present invention to provide an improved container guide system for a bottling machine which does not require tools for adjustment and positioning.

Still another object of the present invention is to provide a bottling machine which is retrofitted to provide container guide assemblies which are adjustable for different size containers without the use of tools.

Yet another object of the present invention is to provide an improved bottling machine which reduces the idle time required for a change over of equipment on the bottling line.

Yet still another object of the present invention is to provide an improved bottling machine with an adjustable body guide assembly and adjustable sidewall guide assembly which is easily attached and retrofitted to existing bottling equipment without significant modification to the existing equipment.

It is yet another object of the present invention to reduce the costs associated with a change over of equipment on a bottling line.

These and other objects of the invention will be become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings to which form a part hereof of and wherein.

DESCRIPTION OF THE PREFERRED EMBODIMENTS

Figure 1:
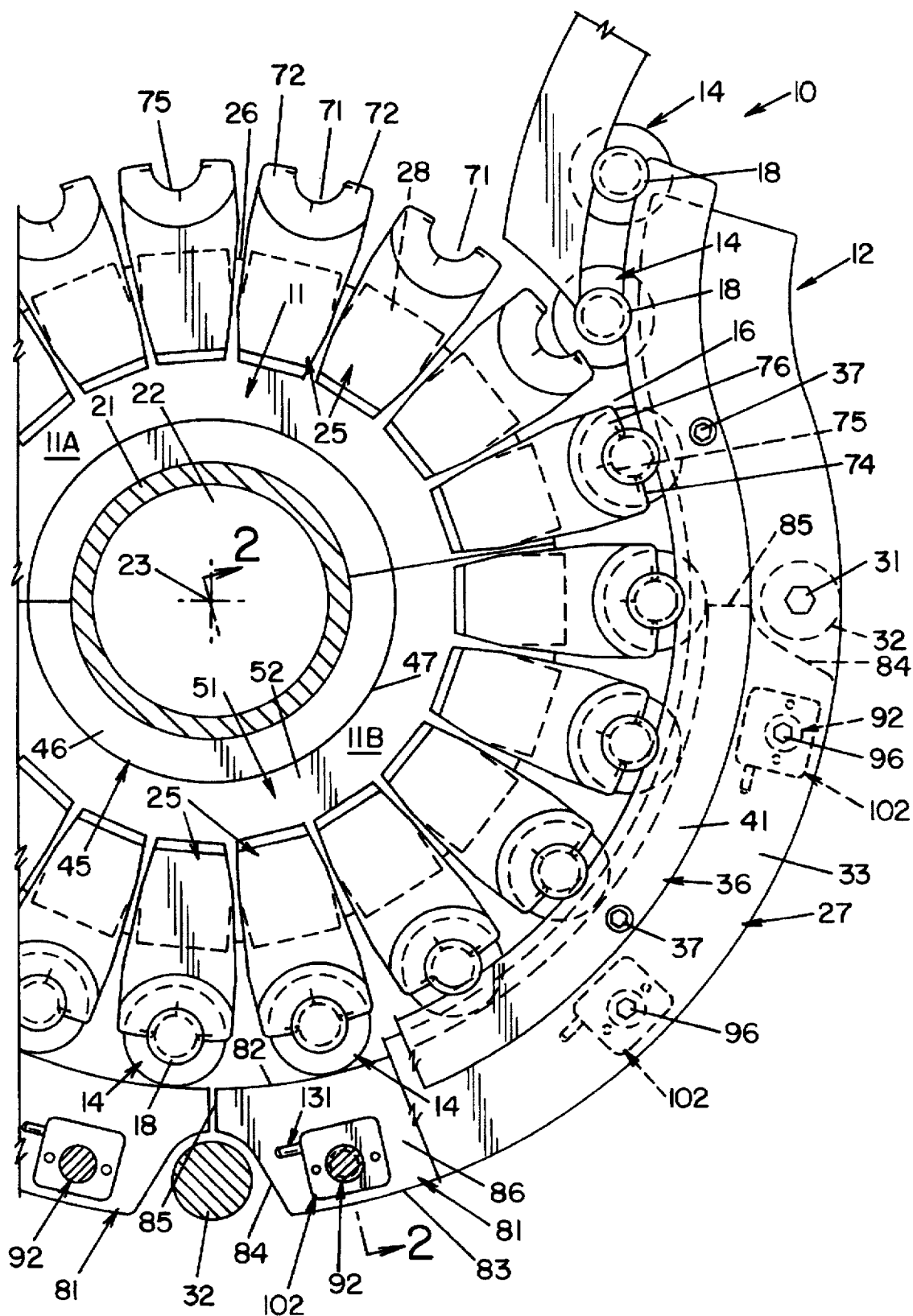
FIG. 1 is a partial plan view of a bottling machine employing the rear container guide assembly of the present invention.
Figure 2:
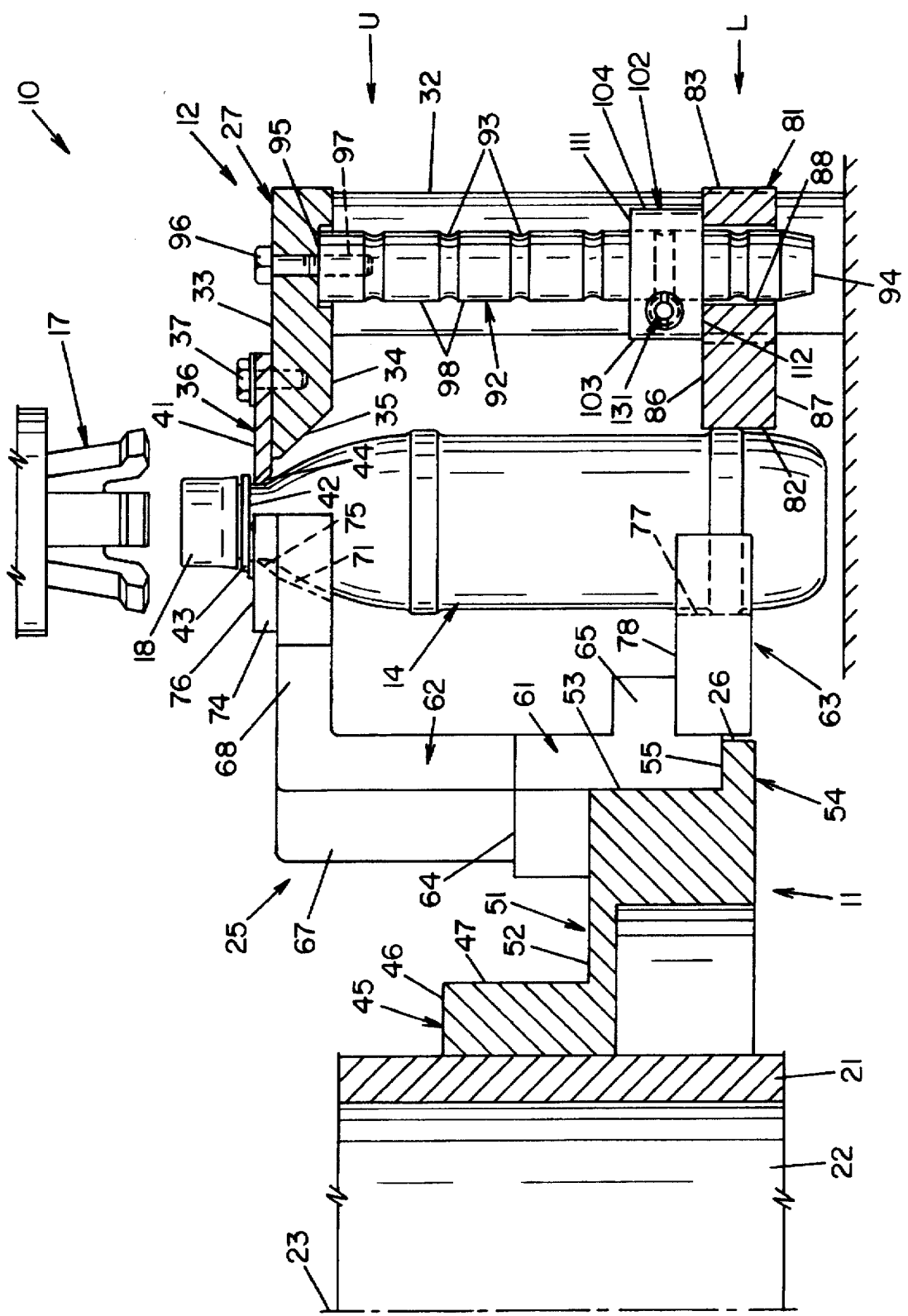
FIG. 2 is a cross-sectional elevation view taken along line 2—2 of FIG. 1.

Referring now to the drawings wherein the showings are for the purpose of illustrating the preferred embodiments of the invention only and not for the purpose of limiting same, FIGS. 1 and 2 show various portions of what is defined as a bottling machine 10. As noted in the background portion of this specification, bottling machine as defined herein includes both filling and capping bottling equipment; filling equipment being that which fills containers with product, such as soft drink, and capping equipment being that which applies a cap, crown or other closure to the container.

Bottling machine 10 includes a rotatable star wheel 11 and a rear container guide assembly 12 spaced radially outwardly from rotatable star wheel 11 for retaining the bottles 14 within rotatable star wheel 11. Depending upon the application of bottling machine 10, an additional star wheel (not shown) or conveyor (not shown) is mated to rotatable star wheel 11 at a fixed entry point (not shown) on rotatable star wheel 11. Bottles 14 are rotated out of rotatable star wheel 11 at a fixed exit point 16 to an outfeed star wheel (not shown) or conveyor (not shown) leading to further processing or handling equipment. FIG. 2 shows a capping machine having capper head 17 for placing a closure 18 on bottle 14. Rotatable star wheel 11 essentially compromises a hub 21 secured to a vertically extending drive shaft 22 which rotates about a drive shaft axis 23.

Extending radially outwardly from hub 21 are a plurality of neck support assemblies 25. As shown, each of neck support assemblies 25 is mounted on star wheel 11 at a neck support station 28. Each of neck support assemblies 25 is arranged about the periphery 26 of rotatable star wheel 11, which is generally circular. Each neck support assembly 25 is removable from star wheel 11 though other embodiments, known in the industry, are available.

Rear container guide 12 includes an annular rear neck guide 27 secured in a stationary manner by the hex head bolts 31 to a frame member 32. Rear neck guide 27 has a top surface 33, a bottom surface 34 and an inclined edge surface 35 which extends radially outwardly from top surface 33 to bottom surface 34. An annular neck block 36 is secured by the hex head fasteners 37 to top surface 33 of rear neck guide 27. Neck block 36 has a top surface 41 which, as shown in FIG. 2, is adapted to being in contact with the underside 42 of a flange 43 of bottle 14. Neck block 36 also includes an inclined edge surface 44 extending radially outward from top surface 41. Fixed rear guide 12 and specifically annular neck block 36 functions to support flange 43 and bottle 14 by retaining bottle 14 on rotatable star wheel 11.

Star wheel 11 extends radially outwardly from hub 21 and has an annular neck portion 45 secured at its inner end to hub 21. Specifically, a neck portion top surface 46 extends radially outwardly to a neck portion edge surface 47 which is generally coaxial with drive shaft axis 23. Neck portion edge surface 47 terminates at a support plate portion 51 having a support plate top surface 52 which also extends radially outward from hub 21 and is generally parallel to top surface 46. Support plate top surface 52 extends radially outwardly to a support plate edge surface 53 which then extends downwardly to a ledge plate portion 54 having a ledge plate top surface 55 parallel to both of top surfaces 46 and 52. Top surface 55 extends radially outwardly to periphery 26 of star wheel 11.

As shown, star wheel 11 is used on large capacity bottling machines. This means that periphery 26 is circular and shaft 22 is fitted with a single hub 21 and star wheel 11 can be used with many different sizes of bottles run on the same bottling line. Neck support assemblies 25 for each size bottle are provided and are also capable of being removed and replaced for different size bottle applications. It will be appreciated that for smaller capacity machines or for different applications within the same bottling line, a star wheel may instead comprise a hub and star wheel portion having individual pockets within the star wheel itself that serves a function similar to neck support assembly 25. In such an instance, individual hubs are designed and removable when it is desired to convert a line to different size bottles. It will be appreciated that in this instance, star wheel 11 is split into two halves 11A and 11B to permit installation and repair without disturbing, for instance, capper head 17 shown schematically at FIG. 2 and further to allow ease of assembly and disassembly by reducing the weight of individual pieces. Such difference in a hub does not affect the present invention.

Neck support assemblies 25 comprise three distinct pieces including a neck support bracket 61, a neck guide 62 and a bottom body guide 63. Neck support bracket 61 is attached to star wheel 11 with neck guide 62 attached to a top surface 64 of neck support bracket 61 and bottom body guide 63 attached to guide support 65 of neck support bracket 61.

Neck guide 62 includes a vertical standard 67 extending upwardly from top surface 64 and a guide bracket 68 extending perpendicular from vertical standard 67 radially outwardly and ending at a retaining pocket 71 formed by the opposite extending fingers 72 extending from guide bracket portion 68. Each retaining pocket 71 is generally semi-circular in configuration and encompasses an included angle of approximately 180 degrees between adjacent fingers 72. A replaceable neck pocket insert 74 is secured to each underlying retaining pocket 71. Neck pocket insert 74 includes a neck pocket 75 having a semi-circular cross section and encompassing an included angle of approximately 180 degrees. Bottle neck flange 43 rests on a top surface 76 of neck pocket insert 74 at an area diametrically opposed to contact established by neck block top surface 41 which coacts and functions to maintain bottle 14 within neck pocket 75 as star wheel 11 rotates. Neck pocket insert 74 prevents rotation of bottle 14 when a closure 18 is tightened thereon by capper head 17.

As shown in FIG. 2, bottom body guide 63 includes a body guide bottom surface 77 and a body guide upper surface 78. Bottom body guide 63 is rigidly attached to neck support bracket 61 and specifically to guide support 65. It will be appreciated that each bottom body guide 63 can have a retaining pocket (not shown) similar in cross section, but larger, to retaining pocket 71. As such, bottom body guide 63 contacts the sidewall of bottle 14 at an area vertically downward from retaining pocket 71 and at an area diametrically opposed to a sidewall contact established by an annular sidewall rear guide 81 to retain bottle 14 substantially vertical while star wheel 11 rotates bottles 14 from a fixed entry point to fixed exit point 16.

Annular sidewall rear guide 81 has an inner radial surface 82 and an outer radial surface 83, the radius of each surface 82 and 83 terminating at drive shaft axis 23. As shown in FIG. 1, annular sidewall rear guide 81 spans between adjacent frame members 32 and includes the curved end surfaces 84 and the abutting end surfaces 85 which span between inner radial surface 82 and outer radial surface 83. Sidewall rear guide 81 includes an upper surface 86 and a lower surface 87. A through-sleeve 88 extends between upper surface 86 and lower surface 87 at three locations in side wall rear guide 81. It will be appreciated that the relative size and relationship of rear guide 81 can remain generally constant for many size bottles since, for instance, the diameter of a one liter, a 12 ounce and a 20 ounce bottle are generally the same. It will also be appreciated that the invention allows that rear guide 81 can be completely changed out and replaced with a different size rear guide 81. The invention allows such a change-out to be simple and without the use of tools.

Suspended from rear neck guide 27 are the vertical stainless steel posts or positioning rods 92 having the circumferential concave grooves 93 spaced at equal increments along a length between lower end 94 and an upper end 95. The ring portion 98 of posts 92 divide each of grooves 93 into equal increments. Vertical stainless steel posts 92 are attached to rear neck guide 27 by the hex head bolts 96 which pass through rear neck guide 27 between top surface 33 and bottom surface 34 and are screwed into a tapped bore 97 within upper end 95 of each of stainless steel posts 92.

Sidewall rear guide 81 is attached to stainless steel post 92 by an adjusting or positioning block 102. Adjusting or positioning block 102 includes the inner and outer sides 103 and 104, respectively as well as the outer edge surfaces 105 and 106. Each of sides 103 and 104 are parallel while each of outer edge surfaces 105 and 106 are parallel. Sides 103, 104 intersect with edge surfaces 105 and 106 at the radius edges 107. Each of sides 103 and 104 and surfaces 105 and 106 extend between an upper positioning side 111 and a lower positioning side 112. Each of positioning blocks 102 include the tapped holes 114 which are adapted to be aligned in substantial registry with the bored holes 115 located between upper surface 86 and lower surface 87 of rear guide 81. Each of the bored holes 115 include a counter bore portion 116 to accommodate the heads 117 of the hex head cap screws 118 which are threaded into tapped holes 114 in order that lower positioning side 112 of positioning block 102 is brought into abutting contact with upper surface 86 of sidewall rear guide 81. In such position, a rod sleeve 121 is located through positioning block 102 between positioning sides 111 and 112, and is aligned in substantial registry with sleeve 88 of rear guide 81. Rod sleeve 121 has a diameter generally equal to or slightly greater than the outside diameter of vertical stainless steel post 92 while sleeve 88 has a diameter which is slightly larger. It will be appreciated that sidewall rear guide 81 is thus capable of sliding up and down in a vertical or longitudinal direction along vertical stainless steel post 92. Sidewall rear guide 81 may thus be easily moved to an optimum position to contact the side wall of bottle 14.

Specifically, side wall rear guide 81 functions to maintain bottles 14 in position while star wheel 11 rotates bottle 14 from an entry point to exit point 16 of the bottling line. The sidewall guide assembly is adjustable between adjacent concave grooves 93 as will be described hereinafter.

Figure 3A:
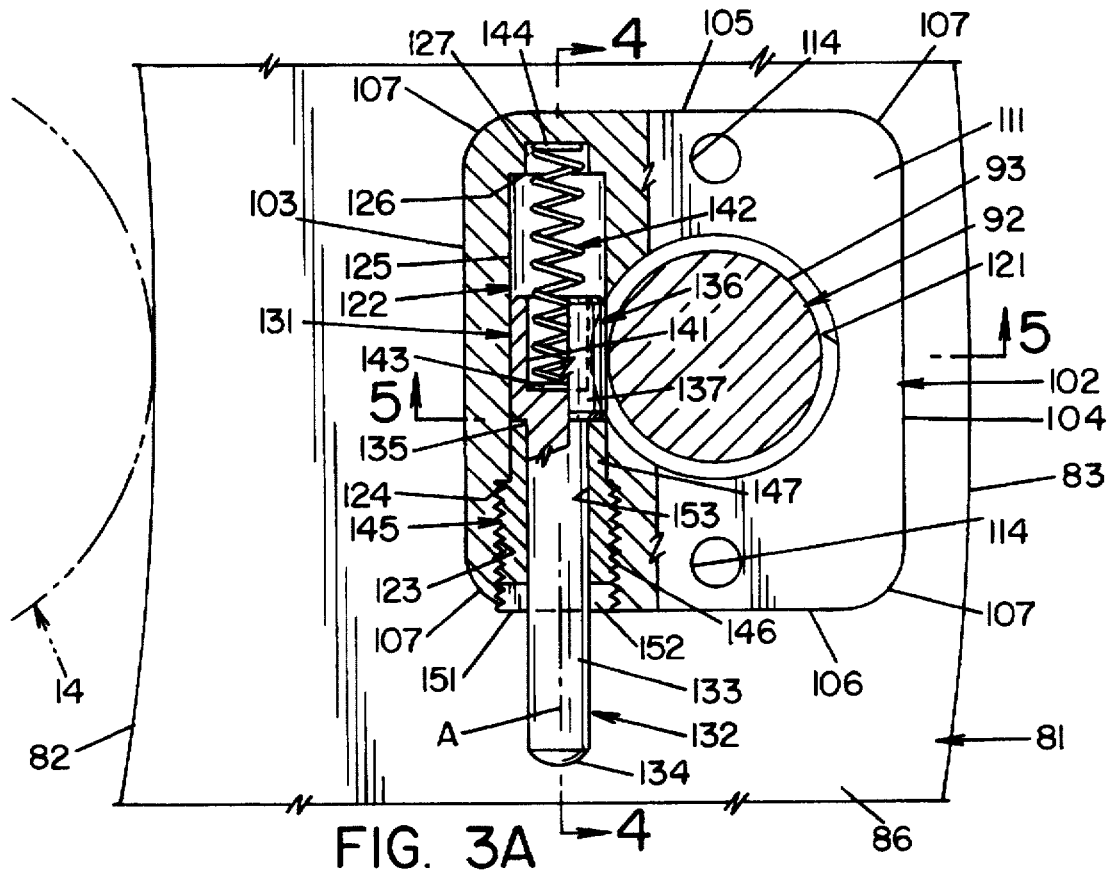
FIG. 3A is a cross-sectional plan view of a sidewall guide assembly of the present invention in the locked position.
Figure 3B:
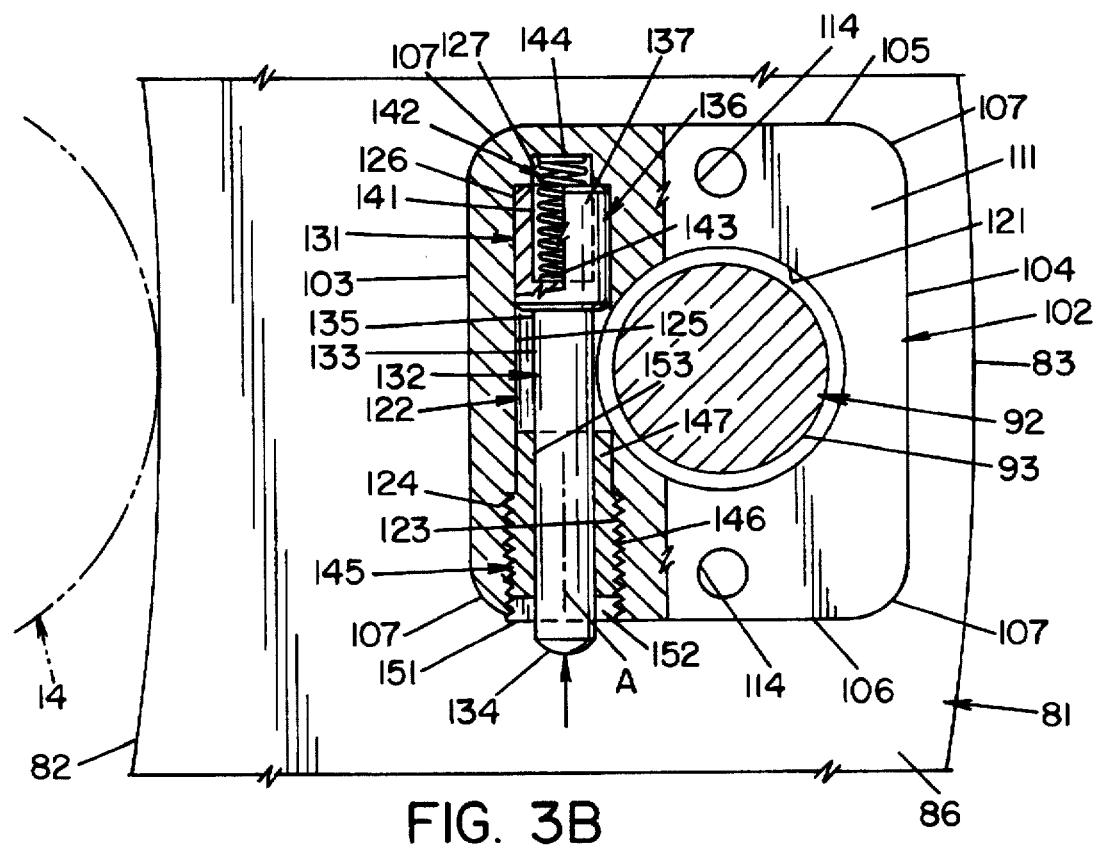
FIG. 3B is a cross-sectional plan view of a sidewall guide assembly of the present invention in an unlocked position.
Figure 4:
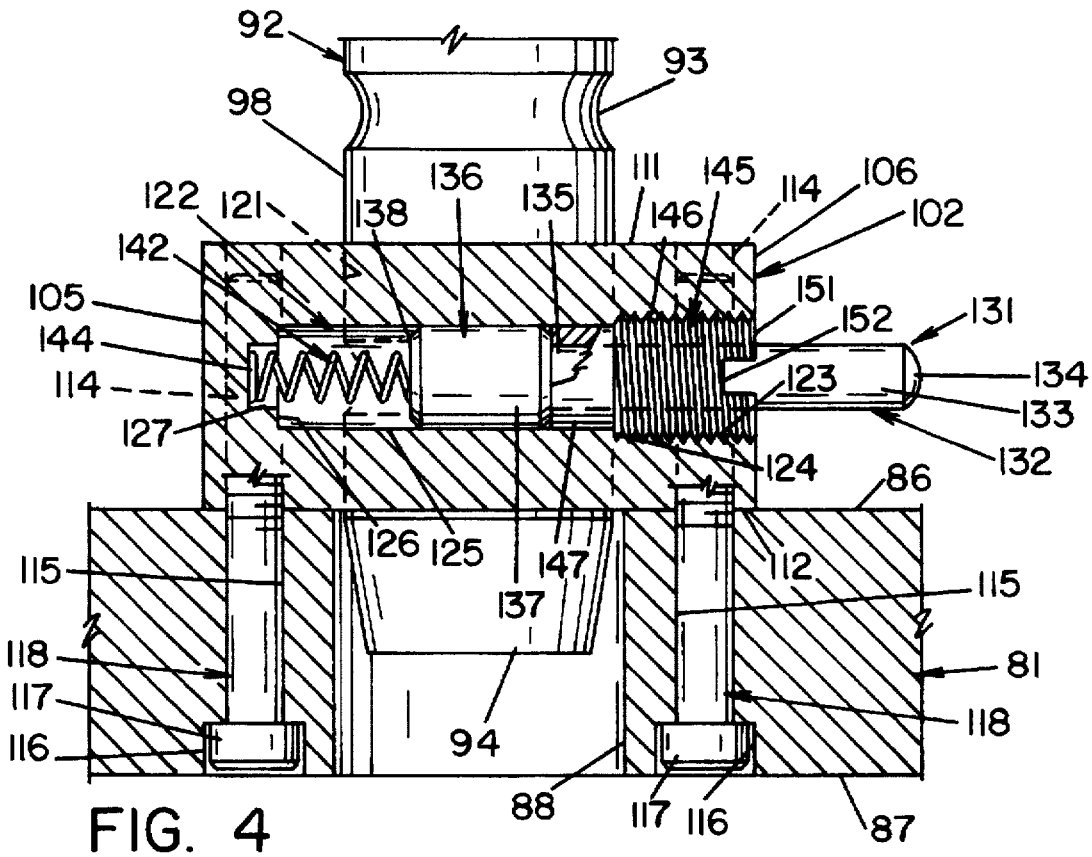
FIG. 4 is a cross-sectional elevation view taken along line 4—4 of FIG. 3A.

A piston hole 122 is bored within adjusting block 102 from outer edge surface 106 and is adjacent and generally parallel to inner side 103. As can be seen in FIGS. 3A and 3B, axis A of piston hole 122 is generally parallel to inner side 103. Piston hole 122 includes a threaded counterbore 123 extending from outer edge surface 106 and terminates at an end surface 124 within counterbore portion 123. Extending further within piston hole 122 is a sleeve portion 125 which extends to an end surface 126. Piston hole 122 then terminates at a seat portion 127 having a diameter of slightly less than that of sleeve portion 125. Piston hole 122 intersects with rod sleeve 121 for purposes which will be described hereinafter.

Fitted within piston hole 122 is an adjustable locking mechanism 131. Adjustable locking mechanism 131 is comprised of a piston plunger 132 having a longitudinally extending rod 133 which in turn includes outwardly extending convex end 134. An inwardly extending end 135 flares outwardly into a post engaging portion 136 forming a cylinder end 137. Opposite outwardly extending convex end 134, cylinder end 137 terminates at a compression end 138. Extending within cylinder end 137 from compression end 138 is a spring seat 141 for receiving a compression spring 142 therein. Compression spring 142 extends from a first end 143, located within spring seat 141, to a second end 144 placed within seat portion 127 of piston hole 122. To retain adjustable locking mechanism 131 in place, a threaded containment insert 145 having a threaded portion 146 at one end and a plug portion 147 at another end is screwed into threaded counter bore portion 123. Adjacent threaded portion 146 is a front face 151 having the screwdriver grooves 152 thereon in order that threaded portion 146 may be screwed into threaded counter bore portion 123 of piston hole 122 as described above.

Adjustable locking mechanism 131 is assembled within piston hole 122 by first placing compression spring 142 within seat portion 127. Piston plunger 132 is then placed within piston hole 122, cylinder end 137 first. Compression spring 142 is seated within spring seat 141 of cylinder end 137. As such, cylinder end 137 is specifically placed within sleeve portion 125 of piston hole 122. Containment insert 145 is then screwed into threaded counterbore portion 123 using screwdriver grooves 152, plug portion 147 extending within sleeve portion 125. Outwardly extending end 134 protrudes through containment insert 145 via an opening 153 therein. It will thus be appreciated that adjustable locking mechanism 131 is capable of moving between extended (locked) and depressed (unlocked) positions shown in FIGS. 3A and 3B respectively, along axis A. FIG. 3A shows compression spring 142 at rest while FIG. 3B shows compression spring 142 compressed so that cylinder end 137 of locking mechanism 131 is adjacent to seat portion 127, with first end 143 of compression spring 142 within spring seat 141. Sidewall rear guide 81 can thus be adjusted between an extreme lower position indicated by the arrow L in FIG. 2 and an extreme upper position indicated by the arrow U, also shown at FIG. 2.

In order to retrofit an existing bottling line to provide the adjustable sidewall rear guide 81, vertical stainless steel posts 92 are provided in the manner described above on annular rear neck guide 27 which is generally standard equipment for a bottling line and machine. Once stainless steel posts 92 have been mounted in a depending fashion from rear neck guide 27 by hex head bolts 96, no further modification to the machine will be necessary. Sidewall rear guides 81 are then provided with positioning blocks 102 mounted thereon. As shown in FIG. 1, each of sidewall rear guides 81 includes three positioning blocks 102 and each rear guide 81 is mounted to adjust on three separate vertical posts 92. When it is desired to move rear guide 81 to a position other than that shown in FIG. 2, adjustable lock mechanism 131 is depressed by pushing outwardly extending end 134 of piston plunger 132. This motion compresses spring 142 and moves cylinder end 137 out of engagement with one of circumferential grooves 93. Thus, adjustable locking mechanism 131 moves from a locked position, shown in FIG. 3A to an unlocked position as shown in FIG. 3B. In the unlocked position, while piston plunger 132 continues to remain in the depressed position, sidewall rear guide 81 and positioning block 102 is slidable along the length of stainless steel post 92 between lower end 94 and upper end 95. When sidewall rear guide 81 is placed in the desired position, piston plunger 132 is released. Piston 132 is thus biased by compression spring 142 from a depressed or unlocked position as shown in FIG. 3B to an extended or locked position as shown in FIG. 3A. Specifically, the releasing of outwardly extending end 134 causes compression spring 142 to bias cylinder end 137, which slides into interfering engagement with one of the circumferential concave grooves 93 of stainless steel post 92 to form an interference fit. In such position, rear guide 81 is positively locked onto vertical post 92 and cannot slide along post 92 without again depressing piston 132.

Figure 5:
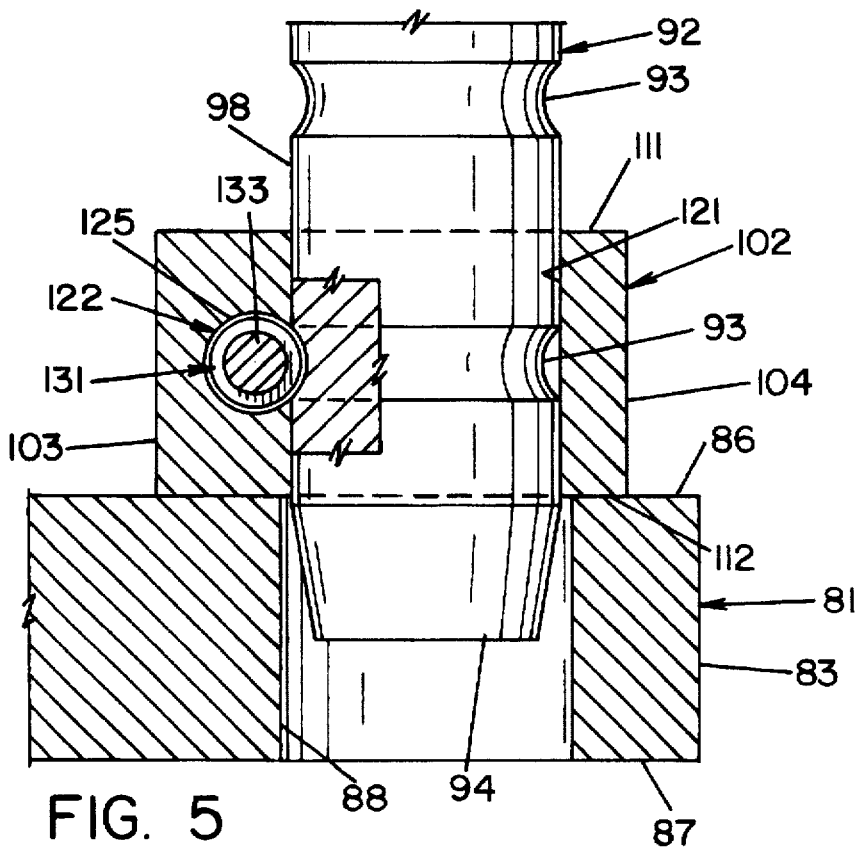
FIG. 5 is a cross-sectional elevation view taken along line 5—5 of FIG. 3A.
Figure 6:
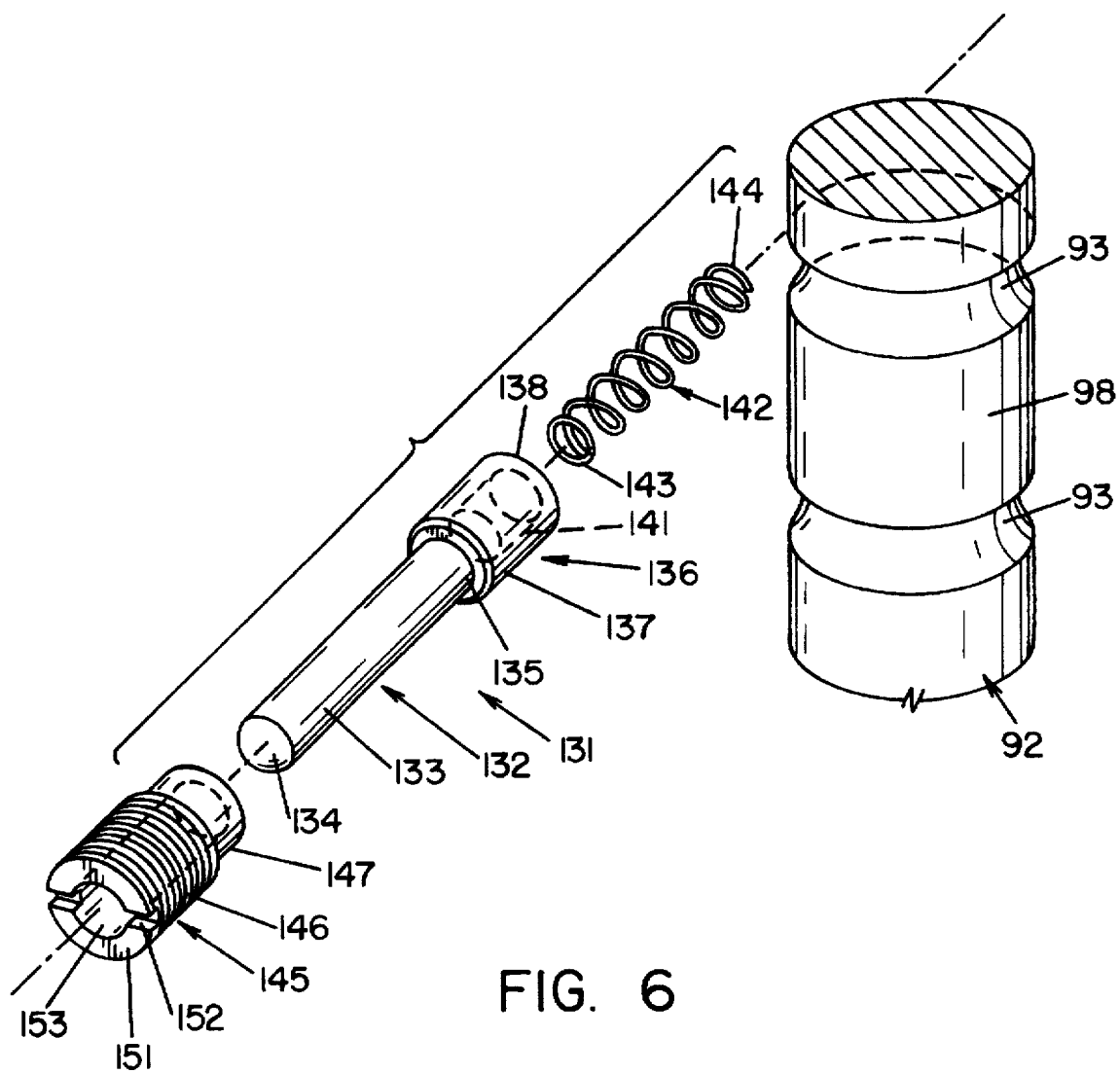
FIG. 6 is an exploded view showing the details of the adjustable locking mechanism in accordance with the present invention.
Figure 7:
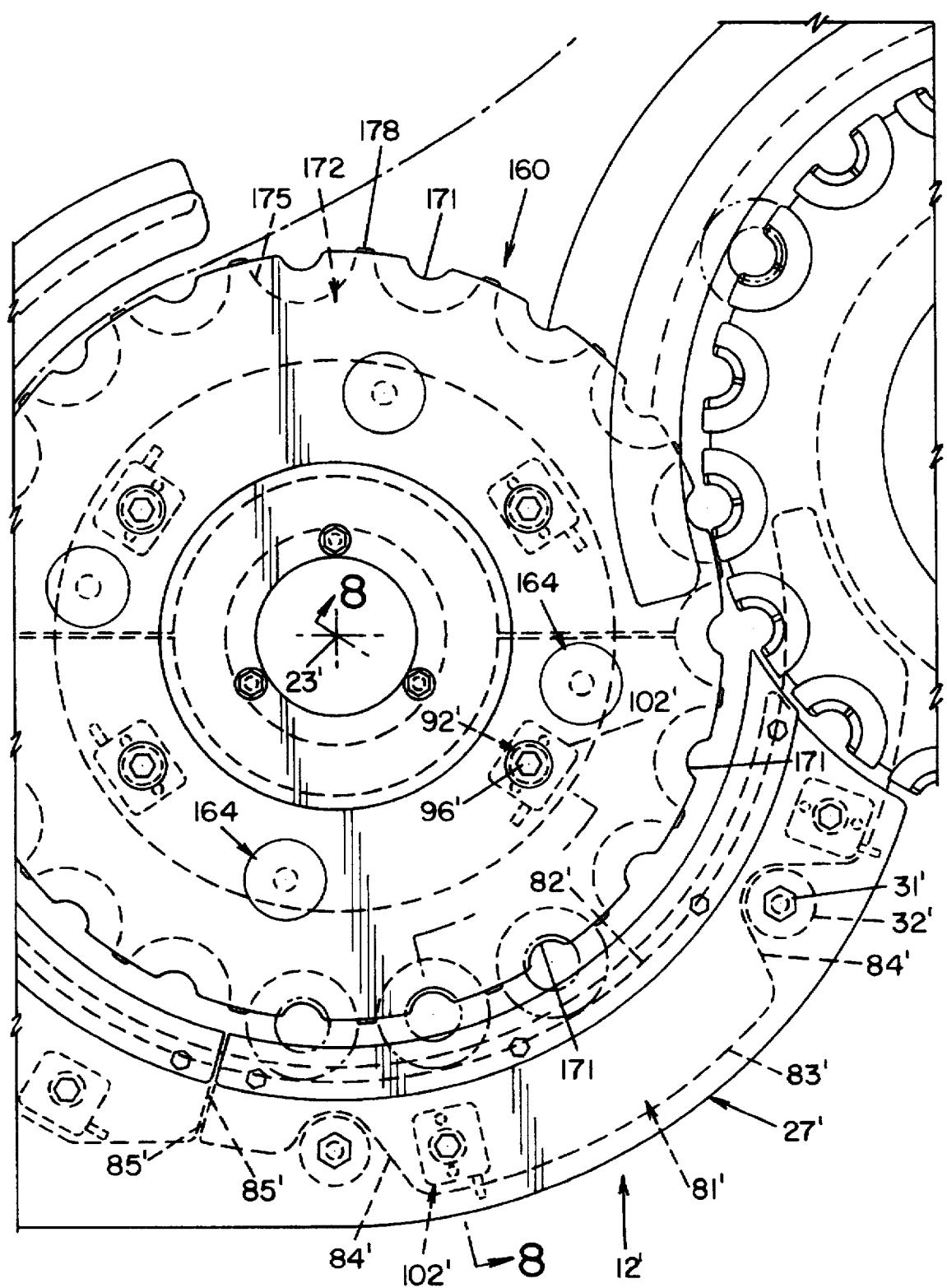
FIG. 7 is a partial plan view of an alternate embodiment of the bottling machine shown in FIG. 1.
Figure 8:
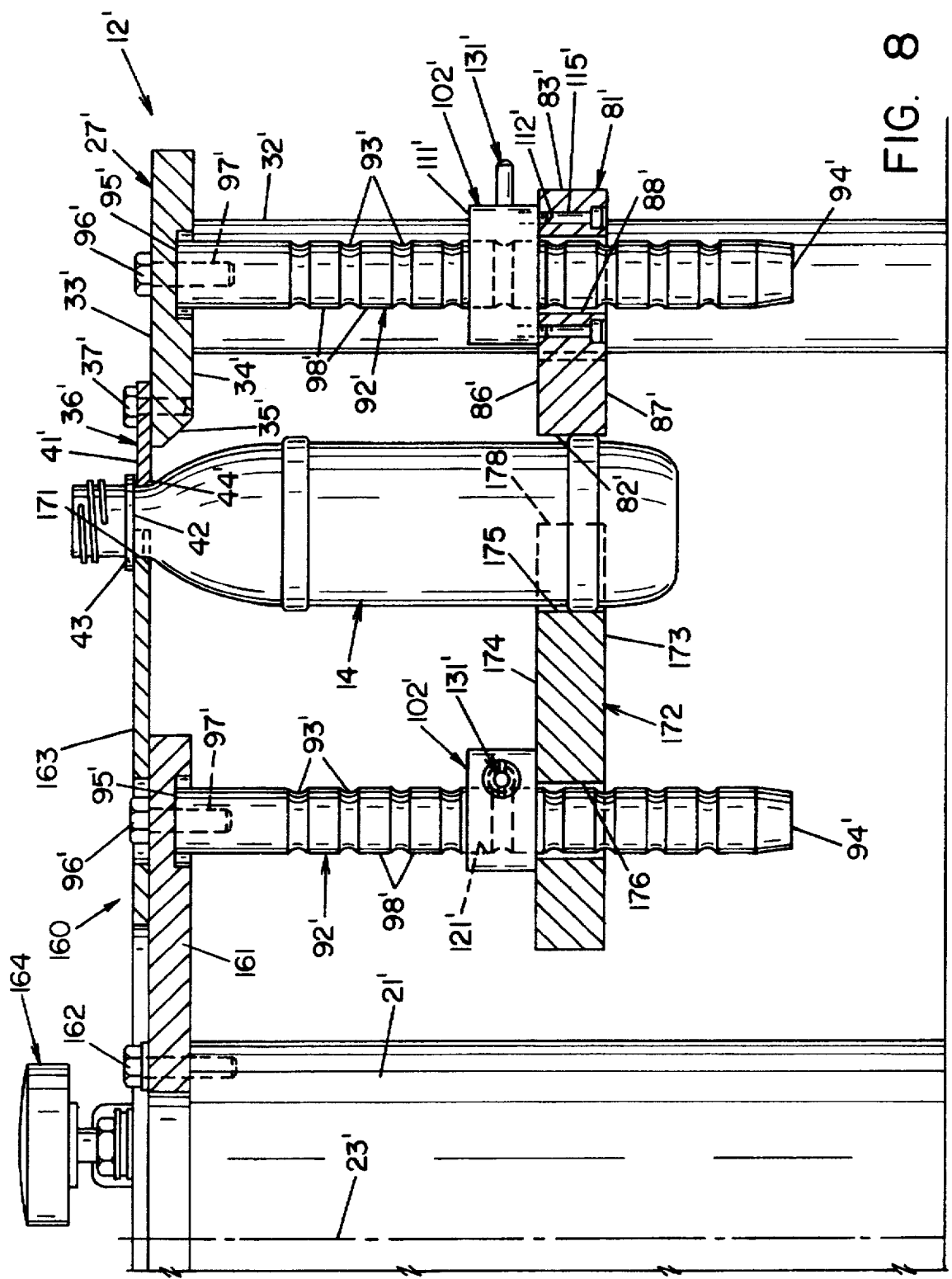
FIG. 8 is a cross-sectional elevation view taken along line 8—8 of FIG. 7.
Figure 9:
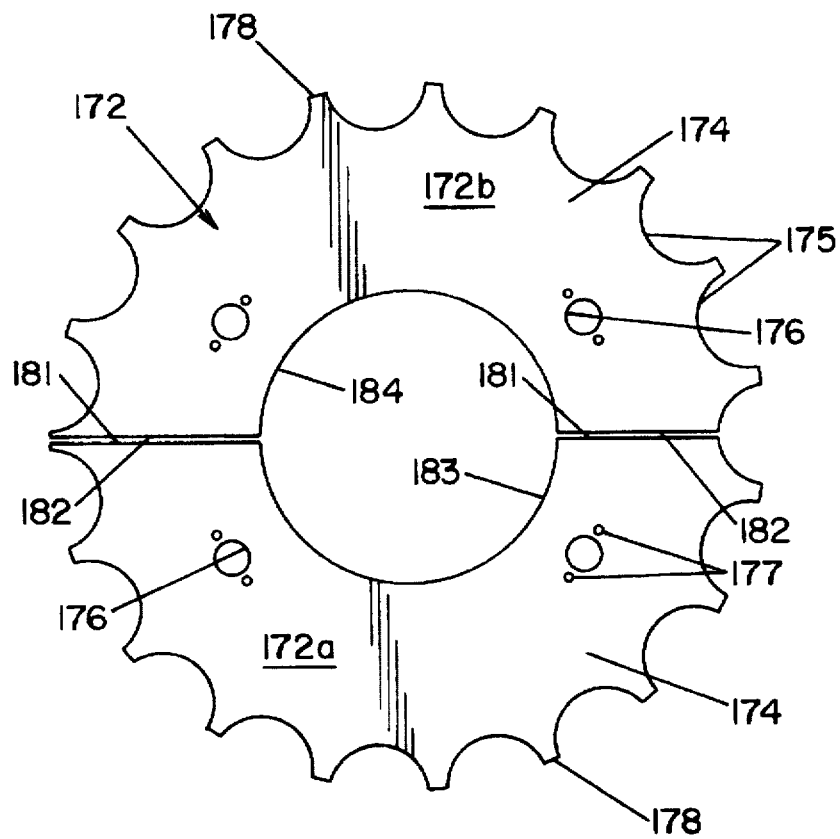
FIG. 9 is a plan view of a body guide assembly of the embodiment of FIG. 8; and, FIG. 10 is a plan view of a sidewall guide assembly of the embodiment of FIG. 8.
Figure 10:
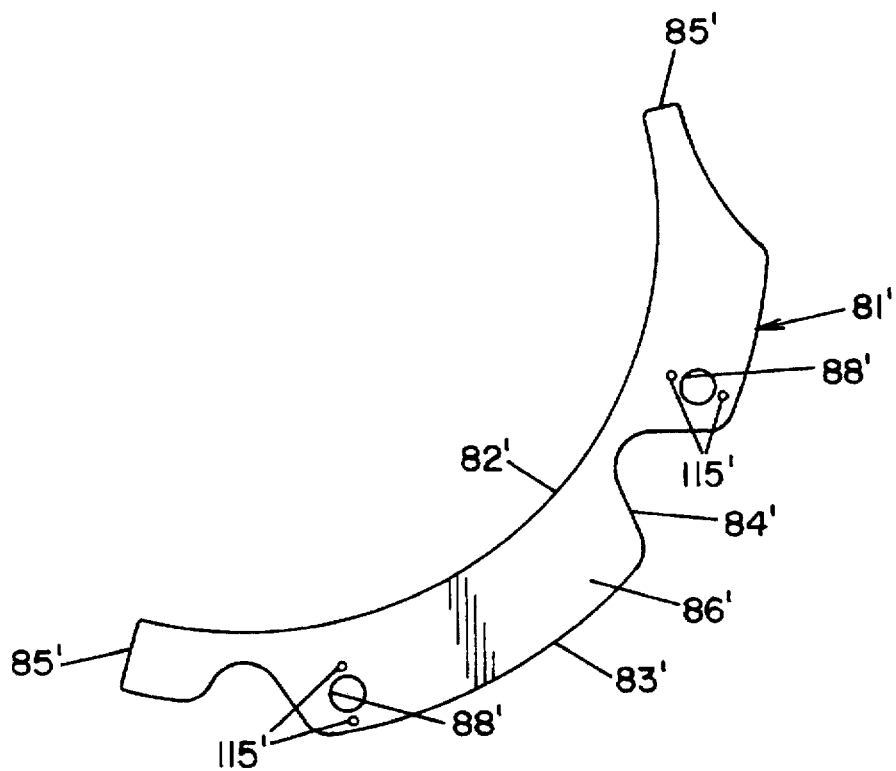

It will be appreciated that the intersection of piston hole 122 and rod sleeve 121 allows the adjustable locking to take place. In order to facilitate this locking, it will also be appreciated that circumferential concave grooves 93 have a radius which is equal to or slightly greater than the radius of cylinder end 137 in order that the cylinder end 137 fits within any one of the concave grooves 93. Further, as shown, rod sleeve 121 is generally perpendicular to piston hole 122. However, the intersection of holes 121 and 122 is an offset intersection, as best seen in FIGS. 3A, 3B and 5. The amount of intersection required between sleeve 121 and hole 122 depends on the radii of concave grooves 93 and cylinder end 137.

FIGS. 7-10 show an alternate embodiment of the present invention. A fixed rear guide 12' is generally identical to fixed rear guide 12, except that fixed rear guide 12' is smaller in diameter. Thus, annular rear neck guide 27 is generally identical to annular rear neck guide 27' and annular sidewall rear guide 81 is generally identical to annular sidewall rear guide 81'. Each has been labeled as such. Further, rotatable star wheel assembly 160, described in detail below, has certain elements which are common to both embodiments, such as vertical posts 92, adjusting block 102 and the details thereof. To the extent possible, the elements shown in FIGS. 7-10 that are common to the embodiment of FIGS. 1-6 are labeled with common numerals which have been primed.

The rotatable star wheel 11 of FIGS 1-6 has been replaced with a rotatable star wheel assembly 160. Star wheel assembly 160 comprises a hub plate 161 permanently mounted to shaft 21' by threaded hex head bolts 162. Mounted thereon is neck support mounting plate 163 held in place by quick connect assemblies 164. As shown, neck support plate 163 has 19 retaining pockets 171 which act to support the underside 42 of flange 43 of bottle 14. It will be appreciated that star wheel 160 rotates about drive shaft axis 23' in a manner identical to that show in FIG. 1.

Suspended from hub plate 161 are the vertical stainless steel posts 92'. Each post 92' is attached to hub plate 161 by a hex head bolt 96'. Each stainless steel post 92' has suspended thereon a bottom body guide or body star 172. Bottom body guide 172 is generally comprised of two equal halves 172a and 172b, each including a bottom surface 173 and a top surface 174. Each half of 172a and 172b also includes the mating edges 181 and 182 respectively, which are connected by inside radial edges 183 and 184, respectively. Preferably, bottom body guide 172 is made of plastic and includes the bottle body retaining pockets 175 along the circumferential edge 178 for substantially aligning with the retaining pockets 171 on neck support plate 163. Each of equal halves 172a and 172b include the trough-bores 176 between top surface 174 and bottom surface 173. Adjusting or positioning blocks 102' and rod sleeve 121' therein are aligned in substantial registry with through-bores 176. Positioning blocks 102' are fastened into place with bolts (not shown) within tapped holes 177.

Adjusting block 102' used for the adjustability feature of bottom body guide 172 and its locking mechanism 131' is identical to adjusting or positioning block 102 except that it is mounted on top surface 174 of bottom body guide 172. It will be appreciated that body guide 172 may be changed out, like rear guide 81 and 81', for different size bottles. In such instance, the replacement body guide (or body star) 172 has a slightly different size retaining pocket 175 to accommodate slight variations in bottle size diameters. Thus, the details shown in FIGS. 3A through FIG. 6 are substantially identical and allow bottom body guide 172 to be adjusted in a manner identical to annular sidewall rear guide 81.

The invention has been described with specific reference to the preferred embodiments, and further modifications and alterations may occur to others upon reading and understanding the specification. It is intended to include all such modifications and alterations in so far as they come within the scope of the invention.

Having thus described the invention, it is claimed:

1. A bottling machine for filling or capping containers having a generally circular cross-section comprising: a rotatable star wheel means for moving said containers through said machine; means on said star wheel means for supporting said containers including pocket support means for holding and supporting said containers therein; rear guide means located radially outwardly from said star wheel means for retaining said container within said pocket support means during rotation of the said star wheel means; said rear guide means including sidewall guide means for maintaining the sidewall of said containers in position during rotation of said star wheel means; and means for adjusting the position of said sidewall guide means to accommodate different size bottles.

2. The bottling machine of claim 1, wherein said means for adjusting the position of said sidewall guide means includes a longitudinally extending positioning rod and positioning block means for releasably attaching to said positioning rod.

3. The bottling machine of claim 2, wherein said positioning block means is fixedly attached to said sidewall guide means.

4. The bottling machine of claim 2, wherein said positioning rod is a post depending from said rear guide means, said post including a plurality of longitudinally spaced concave grooves at increments along the length of said post.

5. The bottling machine of claim 4, wherein said concave grooves are circumferential concave grooves about said post.

6. The bottling machine of claim 5, wherein said concave grooves are spaced at equal increments along said length.

7. The bottling machine of claim 4, wherein said concave grooves are spaced at equal increments along said length.

8. The bottling machine of claim 2, wherein said positioning block means is fixedly attached to said sidewall guide means and includes piston means cooperable with said positioning rod for releasably attaching said positioning block means to said positioning rod.

9. The bottling machine of claim 8, wherein said piston means includes a pistol located within a hole within said positioning block means, said piston means further including biasing means for actuating said piston between a depressed position and an engaged position.

10. The bottling machine of claim 9, wherein said hole within said positioning block means has a bottom and said biasing means includes a compression spring within said hole, said compression spring between said hole bottom and said piston.

11. The bottling machine of claim 9, wherein said piston includes a rod portion at one end and a cylinder portion at a second end, said cylinder portion coacting with said positioning rod to lock said sidewall guide means into position.

12. The bottling machine of claim 11, wherein said positioning rod includes longitudinally spaced concave grooves at increments along said positioning rod.

13. The bottling machine of claim 12, wherein said cylinder portion coacts with one of said longitudinally spaced grooves to form an interference fit to lock said side wall guide means into position.

14. The bottling machine of claim 13, wherein said positioning rod is a post depending from said rear guide means.

15. The bottling machine of claim 11, wherein said cylinder portion includes a bore at said second end, said compression spring within said cylinder portion bore.

16. An improved container guide for a bottling machine for filling or capping containers having a generally circular cross-section, said container guide retaining said containers in said machine during movement through said machine, said machine including a rotatable star wheel means for moving said containers through said machine; means on said star wheel means for supporting said containers including pocket support means for holding and supporting said containers therein; rear guide means located radially outwardly from said star wheel means for retaining said containers within said pocket support means during rotation, said rear guide means including sidewall guide means for maintaining the sidewall of said containers in position during rotation of said star wheel means, the improvement comprising means for adjusting the position of said sidewall guide means to accommodate different size bottles.

17. The container guide of claim 16, wherein said means for adjusting the position of said sidewall guide means includes a longitudinally extending positioning rod and positioning block means for releasably attaching to said positioning rod.

18. The container guide of claim 17, wherein said positioning block means is fixedly attached to said sidewall guide means.

19. The container guide of claim 17, wherein said positioning rod is a post depending from said rear guide means, said post including longitudinally spaced concave grooves at increments along the length of said post.

20. The container guide of claim 19, wherein said concave grooves are a circumferential concave grooves about said post.

21. The container guide of claim 20, wherein said concave grooves are spaced at equal increments along said length.

22. The container guide of claim 19, wherein said concave grooves are spaced at equal increments along said length.

23. The container guide of claim 17, wherein said positioning block means is fixedly attached to said side wall guide means and includes piston means cooperable with said positioning rod for releasably attaching said positioning block means to said positioning rod.

24. The container guide of claim 23, wherein said piston means includes a piston located within a hole within said positioning block means, said piston means further including biasing means for actuating said piston between a depressed position and an engaged position.

25. The container guide of claim 24, wherein said hole within said positioning block means has a bottom and said biasing means includes a compression spring within said hole, said compression spring between said hole bottom and said piston.

26. The container guide of claim 24, wherein said piston includes a rod portion at one end and a cylinder portion at a second end, said cylinder portion coacting with said positioning rod to lock said sidewall guide means into position.

27. The container guide of claim 26, wherein said positioning rod includes longitudinally spaced concave grooves at increments along said positioning rod.

28. The container guide of claim 27, wherein said cylinder portion coacts with one of said longitudinally spaced grooves to form an interference fit to lock said sidewall guide means into position.

29. The container guide of claim 28, wherein said positioning rod is a post depending from said rear guide means.

30. The container guide of claim 26, wherein said cylinder portion includes a bore at said second end, said compression spring within said cylinder portion bore.

31. A bottling machine for filling or capping containers having a generally circular cross-section comprising: a rotatable star wheel means for moving said containers through said machine; means on said star wheel means for supporting said containers including pocket support means for holding and supporting said containers therein; rear guide means located radially outwardly from said star wheel means for retaining said container within said pocket support means during rotation of the said star wheel means; and means for adjusting the position of said star wheel means to accommodate different size bottles without the use of tools.

32. The bottling machine of claim 31, wherein said means for adjusting the position of said star wheel means includes a longitudinally extending positioning rod and positioning block means for releasably attaching to said positioning rod.

33. The bottling machine of claim 32, wherein said star wheel means includes body guide means for maintaining the sidewall of said containers in position during rotation of said star wheel means, said positioning block means being fixedly attached to said body guide means.

34. The bottling machine of claim 32, wherein said positioning rod being a post depending from said pocket support means, said post including a plurality of longitudinally spaced concave grooves at increments along the length of said post.

35. The bottling machine of claim 34, wherein said concave grooves are circumferential concave grooves about said post.

36. The bottling machine of claim 35, wherein said concave grooves are spaced at equal increments along said length.

37. The bottling machine of claim 34, wherein said concave grooves are spaced at equal increments along said length.

38. The bottling machine of claim 32, wherein said positioning block means is fixedly attached to said body guide means and includes piston means cooperable with said positioning rod for releasably attaching said positioning block means to said positioning rod.

39. The bottling machine of claim 38, wherein said piston means includes a piston located within a hole within said positioning block means, said piston means further including biasing means for actuating said piston between a depressed position and an engaged position.

40. The bottling machine of claim 39, wherein said hole within said positioning block means has a bottom and said biasing means includes a compression spring within said hole, said compression spring between said hole bottom and said piston.

41. The bottling machine of claim 39, wherein said piston includes a rod portion at one end and a cylinder portion at a second end, said cylinder portion coacting with said positioning rod to lock said body guide means into position.

42. The bottling machine of claim 41, wherein said positioning rod includes longitudinally spaced concave grooves at increments along said positioning rod.

43. The bottling machine of claim 42, wherein said cylinder portion coacts with one of said longitudinally spaced grooves to form an interference fit to lock said body guide means into position.

44. The bottling machine of claim 43, wherein said positioning rod is a post depending from said pocket support means.

45. The bottling machine of claim 41, wherein said cylinder portion includes a bore at said second end, said compression spring within said cylinder portion bore.

46. An improved rotatable star wheel for a bottling machine for filling or capping containers having a generally circular cross-section, said star wheel for moving said containers through said machine, said star wheel comprising pocket support means for holding and supporting said containers in said machine during movement through said machine; body guide means for maintaining the sidewall of said containers in position during rotation of said star wheel means; and means for adjusting the position of said body guide means to accommodate different size bottles.

47. The star wheel of claim 46, wherein said means for adjusting the position of said body guide means includes a longitudinally extending positioning rod and positioning block means for releasably attaching to said positioning rod.

48. The star wheel of claim 47, wherein said positioning block means is fixedly attached to said body guide means.

49. The star wheel of claim 47, wherein said positioning rod is a post depending from said pocket support means, said post including longitudinally spaced concave grooves at increments along the length of said post.

50. The star wheel of claim 49, wherein said concave grooves are a circumferential concave grooves about said post.

51. The star wheel of claim 50, wherein said concave grooves are spaced at equal increments along said length.

52. The star wheel of claim 49, wherein said concave grooves are spaced at equal increments along said length.

53. The star wheel of claim 47, wherein said positioning block means is fixedly attached to said body guide means and includes piston means cooperable with said positioning rod for releasably attaching said positioning block means to said positioning rod.

54. The star wheel of claim 53, wherein said piston means includes a piston located within a hole within said positioning block means, said piston means further including biasing means for actuating said piston between a depressed position and an engaged position.

55. The star wheel of claim 54, wherein said hole within said positioning block means has a bottom and said biasing means includes a compression spring within said hole, said compression spring between said hole bottom and said piston.

56. The star wheel of claim 54, wherein said piston includes a rod portion at one end and a cylinder portion at a second end, said cylinder portion coacting with said positioning rod to lock said body guide means into position.

57. The star wheel of claim 56, wherein said positioning rod includes longitudinally spaced concave grooves at increments along said positioning rod.

58. The star wheel of claim 57, wherein said cylinder portion coacts with one of said longitudinally spaced grooves to form an interference fit to lock said body guide means into position.

59. The star wheel of claim 58, wherein said positioning rod is a post depending from said pocket support means.

60. The star wheel of claim 56, wherein said cylinder portion includes a bore at said second end, said compression spring within said cylinder portion bore.

61. A bottling machine for filling or capping containers having a generally circular cross-section comprising: a rotatable star wheel means for moving said containers through said machine; means on said star wheel means for supporting said containers including pocket support means for holding and supporting said containers therein; rear guide means located radially outwardly from said star wheel means for retaining said container within said pocket support means during rotation of the said star wheel means; said rear guide means including sidewall guide means for maintaining the sidewall of said containers in position during rotation of said star wheel means; means for adjusting the position of said sidewall guide means; and means for adjusting the position of said star wheel means to accommodate different size bottles.

62. The bottling machine of claim 61, wherein said means for adjusting the position of said sidewall guide means includes a longitudinally extending positioning rod and positioning block means for releasably attaching to said positioning rod.

63. The bottling machine of claim 62, wherein said positioning block means is fixedly attached to said sidewall guide means.

64. The bottling machine of claim 62, wherein said positioning rod is a post depending from said rear guide means, said post including a plurality of longitudinally spaced concave grooves at increments along the length of said post.

65. The bottling machine of claim 62, wherein said positioning block means is fixedly attached to said sidewall guide means and includes piston means cooperable with said positioning rod for releasably attaching said positioning block means to said positioning rod.

66. The bottling machine of claim 61, wherein said means for adjusting the position of said star wheel means includes a longitudinally extending positioning rod and positioning block means for releasably attaching to said positioning rod.

67. The bottling machine of claim 66, wherein said star wheel means includes body guide means for maintaining the side wall of said containers in position during rotation of said star wheel means, said positioning block means being fixedly attached to said body guide means.

68. The bottling machine of claim 66, wherein said positioning rod is a post depending from said pocket support means, said post including a plurality of longitudinally spaced concave grooves at increments along the length of said post.

69. The bottling machine of claim 66, wherein said positioning block means is fixedly attached to said body guide means and includes piston means cooperable with said positioning rod for releasably attaching said positioning block means to said positioning rod.

70. An improved container guide system for a bottling machine for filling or capping containers having a generally circular cross-section, said container guide system retaining said containers in said machine during movement through said machine, said container guide system comprising a rotatable star wheel means for moving said containers through said machine; pocket support means on said star wheel means for holding and supporting said containers therein; body guide means suspended from said star wheel means for maintaining the sidewall of said containers in position during rotation of said star wheel means, and means for adjusting the position of said body guide means to accommodate different size bottles, rear guide means located radially outwardly from said star wheel means for retaining said containers within said pocket support means during rotation, said rear guide means including sidewall guide means for maintaining the sidewall of said containers in position during rotation of said star wheel means, and means for adjusting the position of said sidewall guide means to accommodate different size bottles.

* * * * *